United States Patent
Futa et al.

(10) Patent No.: US 9,709,177 B2
(45) Date of Patent: Jul. 18, 2017

(54) TWO-POSITION, TWO-STAGE SERVO VALVE

(71) Applicant: HONEYWELL INTERNATIONAL INC., Morristown, NJ (US)

(72) Inventors: Paul W. Futa, North Liberty, IN (US); Larry Portolese, Granger, IN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 66 days.

(21) Appl. No.: 14/595,581

(22) Filed: Jan. 13, 2015

(65) Prior Publication Data

US 2016/0201812 A1    Jul. 14, 2016

(51) Int. Cl.
*F16K 11/052* (2006.01)
*F16K 27/02* (2006.01)
(Continued)

(52) U.S. Cl.
CPC ........ *F16K 11/052* (2013.01); *F15B 13/0402* (2013.01); *F15B 13/0438* (2013.01);
(Continued)

(58) Field of Classification Search
CPC .. F16K 11/052; F16K 27/0227; F16K 31/043; F15B 13/043; F15B 13/0431;
(Continued)

(56) References Cited

U.S. PATENT DOCUMENTS 3,135,294 A * 6/1964 Huber ................. F15B 13/0438
137/625.61
3,662,784 A * 5/1972 Perhach .............. F15B 13/0438
137/625.62
(Continued)

FOREIGN PATENT DOCUMENTS

EP    0822359 A1    2/1998
EP    1186814 A2    3/2002
FR    3005133 A1    10/2014

OTHER PUBLICATIONS

Extended EP Search Report for Application No. 16150356.0-1754 dated Feb. 6, 2016.

*Primary Examiner* — Kevin Murphy
*Assistant Examiner* — Kelsey Rohman
(74) *Attorney, Agent, or Firm* — Lorenz & Kopf, LLP

(57) ABSTRACT

A two-position, two-stage servo valve includes a valve body, a valve element, a control pressure chamber, and a control element. The valve body has an inner surface that defines a valve element chamber that includes a first control chamber and a second control chamber. The first control chamber is larger than the second control chamber. The valve element has first and second ends and is disposed within the valve element chamber and is movable between a first valve position and a second valve position. The first end is larger than the second end and is disposed within the first control chamber, and the second end is disposed within the second control chamber. The control pressure chamber includes a control pressure port that is in continuous fluid communication with the first control chamber. The control element is movable between a first control position and a second control position.

15 Claims, 2 Drawing Sheets

(51) Int. Cl.
  *F16K 31/04*    (2006.01)
  *F15B 13/04*    (2006.01)
  *F16K 31/40*    (2006.01)
  *F16K 31/42*    (2006.01)
  *F15B 13/043*   (2006.01)
  *F16K 11/07*    (2006.01)

(52) U.S. Cl.
  CPC ...... *F16K 11/0716* (2013.01); *F16K 27/0227* (2013.01); *F16K 31/043* (2013.01); *F16K 31/406* (2013.01); *F16K 31/426* (2013.01); *Y10T 137/8671* (2015.04); *Y10T 137/86598* (2015.04); *Y10T 137/86614* (2015.04); *Y10T 137/86702* (2015.04)

(58) Field of Classification Search
  CPC ......... F15B 13/0438; Y10T 137/86614; Y10T 137/86702; Y10T 137/8671; Y10T 137/8659; Y10T 137/86598; Y10T 137/86606
  USPC ............ 137/625.64, 625.68, 625.69, 625.61, 137/625.62, 625.63
  See application file for complete search history.

(56) References Cited

U.S. PATENT DOCUMENTS

| | | | | |
|---|---|---|---|---|
| 3,910,314 | A | * | 10/1975 | Nicholson ........... F15B 13/0431 137/625.62 |
| 4,276,809 | A | | 7/1981 | Kast |
| 4,640,475 | A | | 2/1987 | Zoerb |
| 4,785,849 | A | * | 11/1988 | Masuda ............. G05D 16/2093 137/625.6 |
| 5,186,213 | A | * | 2/1993 | Urata ................. F15B 13/0402 137/596.15 |
| 5,697,401 | A | * | 12/1997 | Shinoda ............. F15B 13/0438 137/625.62 |
| 6,786,236 | B2 | | 9/2004 | Jansen |
| 2003/0140975 | A1 | | 7/2003 | Bento |
| 2008/0296403 | A1 | | 12/2008 | Futa, Jr. et al. |
| 2012/0255617 | A1 | | 10/2012 | Miyazoe et al. |

* cited by examiner

TWO-POSITION, TWO-STAGE SERVO VALVE

TECHNICAL FIELD

The present invention generally relates to valves, and more particularly relates to a two-position, two-stage servo valve.

BACKGROUND

Presently known two-stage servo valves quite often use a torque motor in the first stage. Typically, the torque motors that are used include a hydraulic amplifier that is configured as a jet pipe or as a flapper between two nozzles. In both cases, the hydraulic amplifier generates a pressure differential between opposite ends of a second stage spool valve to position it to one of two positions. The jet pipe configuration generates this differential by directing a high velocity jet of fluid into one receiver port while venting the other to low pressure. The flapper/nozzle configuration is more complicated since it relies on two fixed area orifices and two variable area orifices. These four orifices are arranged in a bridge type of configuration with high pressure fluid being supplied to each fixed area orifice. The variable area orifice generates high pressure in one chamber by restricting the flow out of one nozzle, and vents the other chamber.

Regardless of the hydraulic amplifier configuration, there is a constant or quiescent flow of fluid even when the second stage spool is stationary. This constant flow needs to be produced by a pump, such as a main engine pump, and thus continually draws horsepower without producing any motion or work. One method to improve engine efficiency is to minimize these sacrificial losses.

Another type of two-stage servo valve is configured with two control ports. One control port is connected to one end of an actuation piston and the other control port is connected to the other end of the piston. With this type of servo valve the high and low pressure sources are simply reversed to each control port to drive the actuator in one direction or the other. However, with this type of servo valve, the first stage still requires a continuous flow of fluid to hold the second stage in position. Some of these valve styles are also designed to latch in the last commanded position so that a continuous application of electrical current is not needed. Although this reduces the need for electric power, it simply holds the first stage against stops so that the pressure levels are maintained at each end of the spool. Moreover, the first stage still requires a continuous flow of fluid. The addition of latching also increases the level of complexity and cost of the torque motor. This is especially the case with the jet pipe configuration which inherently does not have hardened surfaces to hold the armature in place for long durations.

Hence, there is a need for two-position, two-stage servo valve that does not rely on a continuous flow of fluid and/or does not require fixed area orifices and/or does not rely on the cost and complexity of latching. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a two-position, two-stage servo valve includes a valve body, a valve element, a control pressure chamber, and a control element. The valve body has an inner surface that defines a valve element chamber. The valve element chamber includes a first control chamber and a second control chamber. The first control chamber larger than the second control chamber. The valve element is disposed within the valve element chamber and is movable between a first valve position and a second valve position. The valve element includes a first end and a second end. The first end is larger than the second end and is disposed within the first control chamber, and the second end is disposed within the second control chamber. The control pressure chamber includes a supply pressure port, a return pressure port, and a control pressure port. The control pressure port is in continuous fluid communication with the first control chamber. The control element is at least partially disposed within the control pressure chamber and is movable between a first control position and a second control position. When the control element is in the first control position, the supply pressure port is in fluid communication with the control pressure port and the return pressure port is fluidly isolated from the control pressure port, and when the control element is in the second position, the return pressure port is in fluid communication with the control pressure port and the supply pressure port is fluidly isolated from the control pressure port.

In another embodiment, a two-position, two-stage servo valve includes a valve body, a valve element, a control pressure chamber, and a control element. The valve body has an inner surface that defines a valve element chamber. The valve element chamber includes a first control chamber and a second control chamber. The first control chamber is larger than the second control chamber. The valve element is disposed within the valve element chamber and is movable between a first valve position and a second valve position. The valve element includes a first end and a second end. The first end is larger than the second end and is disposed within the first control chamber, and the second end is disposed within the second control chamber. The control pressure chamber includes a supply pressure port, a return pressure port, and a control pressure port. The supply pressure port is adapted to fluidly communicate with a supply pressure. The return pressure port is adapted to fluidly communicate with a return pressure that is less than the supply pressure, and the control pressure port is in continuous fluid communication with the first control chamber. The control element is at least partially disposed within the control pressure chamber and is movable between a first control position and a second control position. When the control element is in the first control position, the control pressure port is in fluid communication with the supply pressure port and the first control chamber, and is fluidly isolated from the return pressure port, and when the control element is in the second position, the control pressure port is in fluid communication with the return pressure port and the first control chamber, and is fluidly isolated from the supply pressure port.

In yet another embodiment, a two-position, two-stage servo valve includes a control pressure chamber, a control element, a valve body, and a valve element. The control pressure chamber includes a supply pressure port, a return pressure port, and a control pressure port. The control element is at least partially disposed within the control pressure chamber and is movable between a first control position, in which the control chamber is in fluid communication with the supply pressure port and is fluidly isolated from the return pressure port, and a second control position, in which the control chamber is in fluid communication with the return pressure port and is fluidly isolated from the supply pressure port. The valve body includes a supply pressure inlet port, a return pressure outlet port, a first control pressure inlet/outlet port, a second control pressure inlet/outlet port, and an inner surface that defines a valve element chamber. The supply pressure inlet port is in continuous fluid communication with the supply pressure port. The return pressure outlet port is in continuous fluid communication with the return pressure port. The valve element chamber includes a first control chamber and a second control chamber. The first control chamber is larger than the second control chamber and is in continuous fluid communication with the control pressure port. The second control chamber is in continuous fluid communication with the supply pressure inlet port. The valve element disposed within the valve element chamber and includes a first end and a second end. The first end is larger than the second end and is disposed within the first control chamber, and the second end is disposed within the second control chamber. The valve element is responsive to fluid pressure changes in the first control chamber to move between a first valve position and a second valve position.

Furthermore, other desirable features and characteristics of the two-position, two-stage servo valve will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
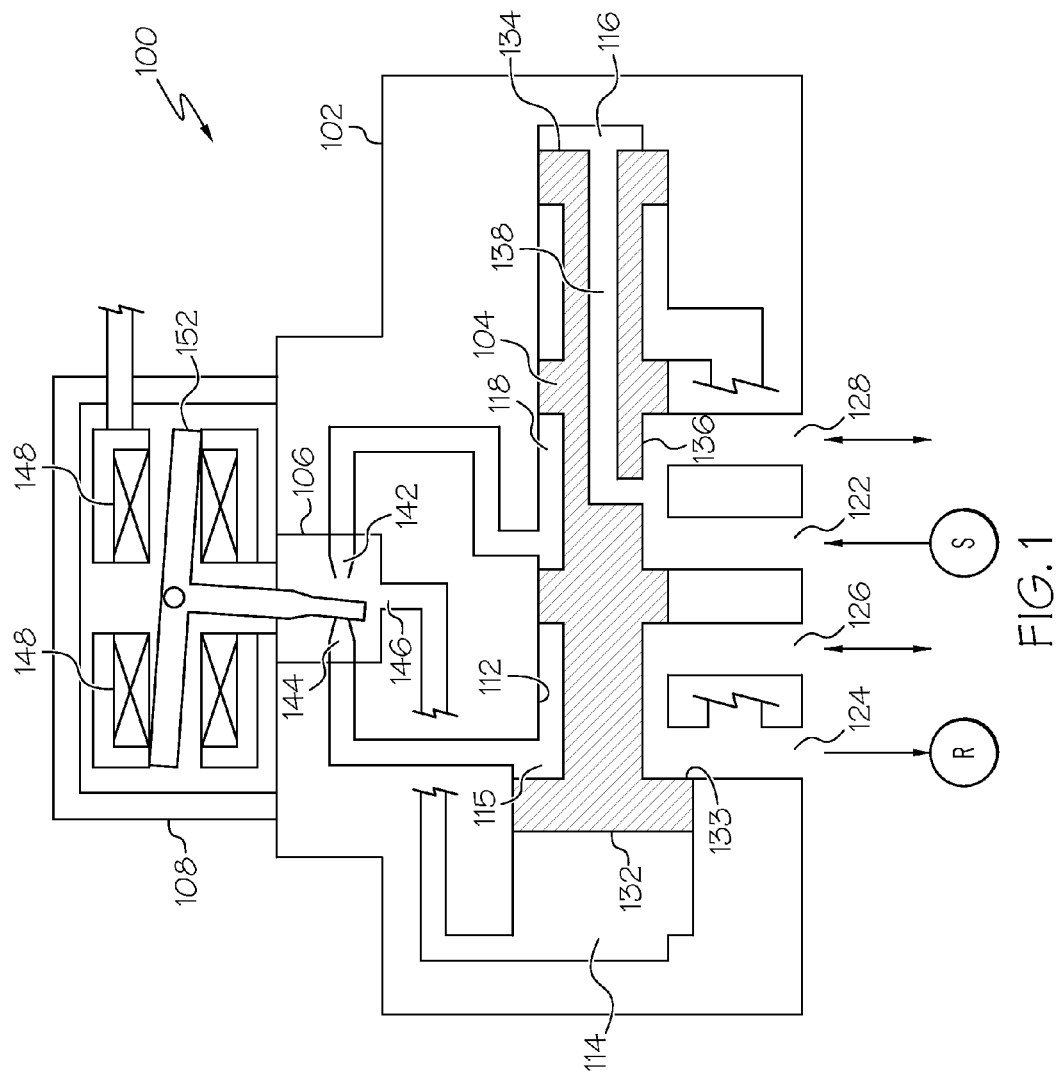
FIG. 1 depicts a cross section schematic representation of one embodiment of a two-stage, two position servo valve in a first position.

Referring to FIG. 1, a cross section schematic representation of one embodiment of a two-stage, two position servo valve 100 is depicted and includes a valve body 102, a valve element 104, a control pressure chamber 106, and a control element 108. The valve body 102 includes an inner surface 112 that defines a valve element chamber. The valve element chamber includes a first control chamber 114, a second control chamber 116, a third control chamber 115, and an intermediate chamber 118 between the second and third control chambers 115 and 116. The diameter of the first control chamber 114 is larger than the diameter of the second control chamber 116, for reasons that will become apparent further below. As FIG. 1 further depicts, the valve body 102 additionally includes a supply pressure inlet port 122, a return pressure outlet port 124, a first control pressure inlet/outlet port 126, and a second control pressure inlet/outlet port 128.

Figure 2:
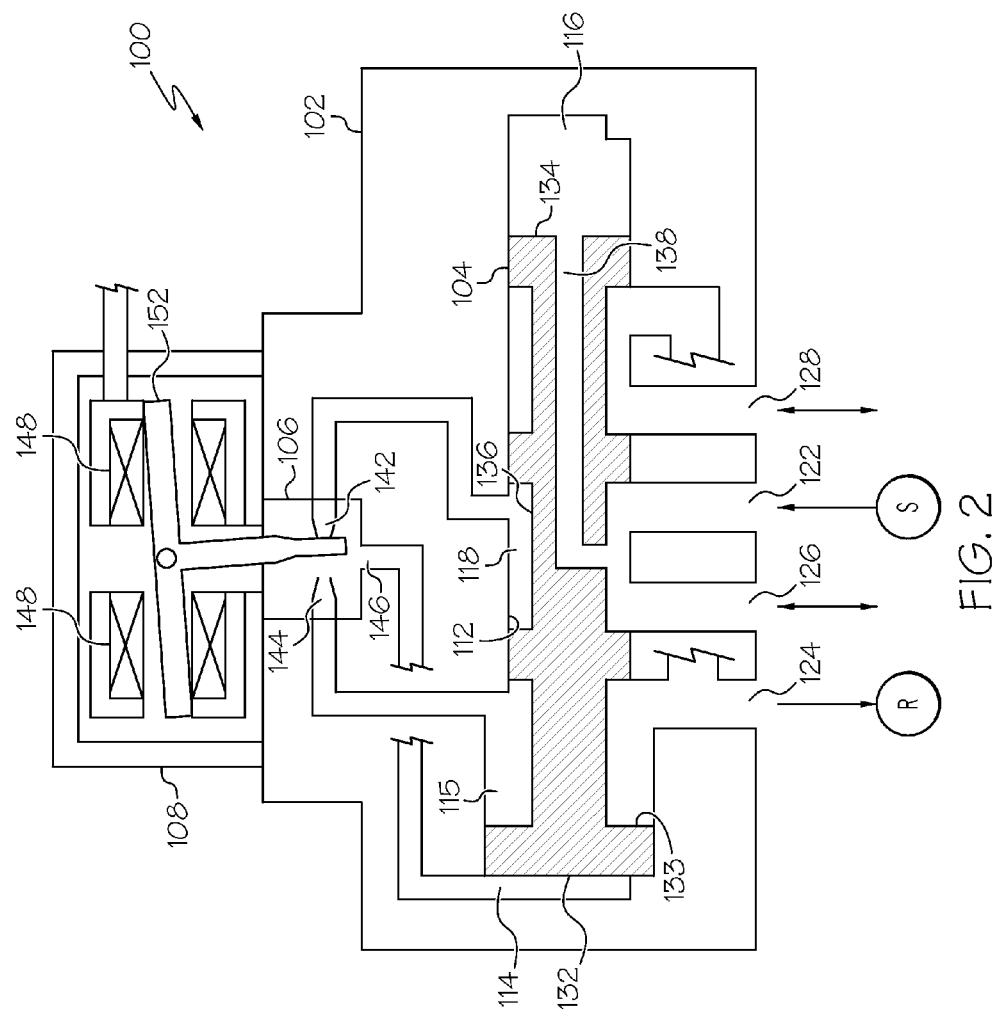
FIG. 2 depicts a cross section schematic representation of the two-stage, two position servo valve of FIG. 1 in a second position.

The valve element 104 is disposed within the valve element chamber 102 and is movable between a first valve position, which is the position depicted in FIG. 1, and a second valve position, which is the position depicted in FIG. 2. The valve element 104 may be variously configured, but in the depicted embodiment it is a spool valve element that includes a first end 132, a second end 134, an intermediate face 133, and an intermediate section 136. The first end 132 is larger than the second end 134 and is disposed within the first control chamber 114. The intermediate face 133, which has an annular area that is smaller than the first end 132, is disposed within the third control chamber 115. And the second end 134 is disposed within the second control chamber 116.

The valve element 104 also has an internal channel 138 formed therein. The internal channel 138 extends between the second end 134 and the intermediate section 136, and provides continuous fluid communication between the supply pressure inlet port 122 and the second control chamber 116 via the intermediate chamber 118, regardless of the position of the valve element 104. Although in the depicted embodiment the internal channel 138 is formed within the valve element 104, in other embodiments it could alternately formed in the valve body 102 to provide the continuous fluid communication between the second control chamber 116 and supply pressure inlet port 122.

The control pressure chamber 106 includes a supply pressure port 142, a return pressure port 144, and a control pressure port 146. Before proceeding further, it is noted that the control pressure chamber 106 is depicted as being integrally formed in the valve body 102. It will be appreciated that this is merely exemplary of one particular embodiment and that in other embodiments the control pressure chamber 106 may be formed in a structure that is separate from the valve body 102.

Regardless of which structure the control pressure chamber 106 is formed in, the supply pressure port 142 is in continuous fluid communication with the supply pressure inlet port 122, via the intermediate chamber 118. The supply pressure port 142 is thus in continuous fluid communication with the second control chamber 116 via the internal channel 138. The return pressure port 144 is in continuous fluid communication with both the third control chamber 115 and the return pressure outlet port 124. The control pressure port 146 is in continuous fluid communication with the first control chamber 114. The control pressure port 146, and thus the first control chamber 114, is also in fluid communication with either the supply pressure port 142 or the return pressure port 144, depending upon the position of the control element 108.

An embodiment of the control element 108 will now be described. Before doing so, however, it is noted that the supply pressure port 142 and the return pressure port 144 are both preferably, though not necessarily, configured as nozzles. It is additionally noted that the supply pressure port 142, the return pressure port 144, and the control element 108 are configured such that the control element 108, depending upon its position, can fluidly isolate (or at least substantially fluidly isolate) the control pressure chamber 146 from either the supply pressure port 142 or the return pressure port 144.

Turning now to a description of the control element 108, this element 108 is at least partially disposed within the control pressure chamber 106, and is movable between a first control position (FIG. 1) and a second control position (FIG. 2). When the control element 108 is in the first control position (FIG. 1), the supply pressure port 142 is in fluid communication with the control pressure port 146, and the return pressure port 144 is fluidly isolated from the control pressure port 146. Conversely, when the control element 108 is in the second control position (FIG. 2), the return pressure port 144 is in fluid communication with the control pressure port 146, and the supply pressure port 142 is fluidly isolated from the control pressure port 146.

It will be appreciated that the control element 108 may be variously configured and implemented, but in the depicted embodiment the control element 108 is implemented as a torque motor that is coupled to the valve body 102 and includes a plurality of coils 148, an armature/flapper 152. The coils 148 are adapted to be controllably energized from a non-illustrated source. The armature/flapper 152 is rotationally mounted proximate the coils 148 and extends into the control pressure chamber 106. As is generally known, the rotational position of the armature/flapper 152 can be controlled by controllably energizing the coils 148. Thus, by controllably energizing the coils 148, the armature/flapper 152 is controllably rotated between the first control position and a second control position.

Having described the two-position, two-stage servo valve 100 structurally, and the operation of various elements that comprise the two-position, two-stage servo valve 100, the overall operation of the two-position, two-stage servo valve 100 will now be described. Before doing so, it is noted that the two-position, two-stage servo valve 100 is connected such that the supply pressure inlet port 122 is coupled to a relatively high pressure supply fluid source (S), and the return pressure outlet port 124 is coupled to a relatively low pressure return fluid source (R).

When connected as described above, when the coils 148 are energized such that the armature/flapper 152 is rotated to the first position (FIG. 1), the supply pressure port 142 is in fluid communication with the control chamber 106, and the armature/flapper 152 fluidly isolates the return pressure port 144 from the control chamber 106. As a result, the relatively high pressure supply fluid source is in fluid communication, via the supply pressure inlet port 122, the supply pressure port 142, and the control pressure port 146, with the first control chamber 114. Because the first end 132 of the valve element 104 has a larger area than the sum of the annular area of intermediate face 133 and the area of second end 134, the valve element 104 translates to the first position, overcoming the low pressure acting on intermediate face 133, and the high pressure acting on second end 134. In this position, the relatively high pressure supply fluid source is also in fluid communication with the second control pressure inlet/outlet port 128, and the relatively low pressure return fluid source is in fluid communication with the first control pressure inlet/outlet port 126.

Alternatively, when the coils 148 are energized such that the armature/flapper 152 is rotated to the second position (FIG. 2), the return pressure port 144 is in fluid communication with the control chamber 106, and the armature/flapper 152 fluidly isolates the supply pressure port 142 from the control chamber 106. As a result, the relatively low pressure return fluid source is in fluid communication, via the return pressure inlet port 124, the return pressure port 144, and the control pressure port 146, with the first control chamber 114. Because the relatively high pressure supply fluid source is in continuous fluid communication, via the supply pressure inlet port 122 and the internal channel 138, with the second control chamber 116, the valve element 104 translates to the second position. In this position, the relatively high pressure supply fluid source is also in fluid communication with the first control pressure inlet/outlet port 126, and the relatively low pressure return fluid source is in fluid communication with the second control pressure inlet/outlet port 128.

The two-position, two-stage servo valve described herein provides several advantages over presently known valves. For example, because the second stage does not need to continuously modulate it offers the opportunity to shut off the flow of the first stage when it does not need to move. As a result, only a single fluid pressure at one end of the valve element needs to be modulated instead of both pressures at each end of the valve element. In addition, fluid does not continuously flow through the supply and return pressure ports, and there are no fixed area orifices feeding these ports. When the valve element stops, fluid flow stops and no additional flow is needed. The valve also provides a cost advantage over presently known nozzle flapper two position, two-stage servo valves, in that two fixed area orifices are eliminated, and features required for latching a jet pipe torque motor servo valve are not needed.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A two-position, two-stage servo valve, comprising:
 a valve body having an inner surface that defines a valve element chamber, the valve element chamber including a first control chamber, a second control chamber, and a third control chamber, the first control chamber larger than the second control chamber, the third control chamber located between the first control chamber and the second control chamber;

a valve element disposed within the valve element chamber and movable between a first valve position and a second valve position, the valve element including a first end, a second end, and an intermediate face, the first end larger than the second end and disposed within the first control chamber, the second end disposed within the second control chamber, the intermediate face located between the first end and the second end and disposed within the third control chamber;

a control pressure chamber including a supply pressure port, a return pressure port, and a control pressure port, the control pressure port in continuous fluid communication with the first control chamber, the return pressure port in continuous fluid communication with the third control chamber; and a control element at least partially disposed within the control pressure chamber and movable between a first control position and a second control position, wherein:
the first end of the valve element has a first area, the second end of the valve element has a second area, and the intermediate face has an annular area, the first area is larger than a sum of the second area and the annular area, when the control element is in the first control position, the supply pressure port is in fluid communication with the control pressure port and the return pressure port is fluidly isolated from the control pressure port, and when the control element is in the second position, the return pressure port is in fluid communication with the control pressure port and the supply pressure port is fluidly isolated from the control pressure port.

2. The valve of claim 1, wherein:
the supply pressure port is continuously in fluid communication with the second control chamber.

3. The valve of claim 1, wherein:
the valve body includes a supply pressure inlet port, a return pressure outlet port, a first control pressure inlet/outlet port, and a second control pressure inlet/outlet port;

the supply pressure inlet port is in continuous fluid communication with the supply pressure port and the second control chamber;

the return pressure outlet port is in continuous fluid communication with the return pressure port;

the first control pressure inlet/outlet port is in fluid communication with the return pressure outlet port when the valve element is in the first valve position, and is in fluid communication with the supply pressure inlet port when the valve element is in the second valve position; and the second control pressure inlet/outlet port is in fluid communication with the supply pressure outlet port when the valve element is in the first valve position, and is in fluid communication with the return pressure outlet port when the valve element is in the second valve position.

4. The valve of claim 3, wherein the valve element has an internal channel formed therein that provides continuous fluid communication between the supply pressure inlet port and the second control chamber.

5. The valve of claim 1, wherein the control element comprises a torque motor.

6. The valve of claim 5, wherein the torque motor comprises:
a plurality of coils adapted to be controllably energized;

an armature/flapper rotationally mounted proximate the coils and extending into the control pressure chamber, the armature/flapper configured, in response to the coils being energized, to rotate between the first control position and the second control position.

7. A two-position, two-stage servo valve, comprising:
a valve body having an inner surface that defines a valve element chamber, the valve element chamber including a first control chamber, a second control chamber, and a third control chamber, the first control chamber larger than the second control chamber, the third control chamber located between the first control chamber and the second control chamber;

a valve element disposed within the valve element chamber and movable between a first valve position and a second valve position, the valve element including a first end, a second end, and an intermediate face, the first end larger than the second end and disposed within the first control chamber, the second end disposed within the second control chamber, the intermediate face located between the first end and the second end and disposed within the third control chamber;

a control pressure chamber including a supply pressure port, a return pressure port, and a control pressure port, the supply pressure port adapted to fluidly communicate with a supply pressure, the return pressure port adapted to fluidly communicate with a return pressure that is less than the supply pressure, the control pressure port in continuous fluid communication with the first control chamber, the return pressure port in continuous fluid communication with the third control chamber; and a control element at least partially disposed within the control pressure chamber and movable between a first control position and a second control position, wherein:
the first end of the valve element has a first area, the second end of the valve element has a second area, and the intermediate face has an annular area, the first area is larger than a sum of the second area and the annular area, when the control element is in the first control position, the control pressure port is in fluid communication with the supply pressure port and the first control chamber, and is fluidly isolated from the return pressure port, and when the control element is in the second position, the control pressure port is in fluid communication with the return pressure port and the first control chamber, and is fluidly isolated from the supply pressure port.

8. The valve of claim 7, wherein:
the supply pressure port is continuously in fluid communication with the second control chamber.

9. The valve of claim 7, wherein:
the valve body includes a supply pressure inlet port, a return pressure outlet port, a first control pressure inlet/outlet port, and a second control pressure inlet/outlet port;

the supply pressure inlet port is in continuous fluid communication with the supply pressure port and the second control chamber;

the return pressure outlet port is in continuous fluid communication with the return pressure port;

the first control pressure inlet/outlet port is in fluid communication with the return pressure outlet port when the valve element is in the first valve position, and is in fluid communication with the supply pressure outlet port when the valve element is in the second valve position; and the second control pressure inlet/outlet port is in fluid communication with the supply pressure outlet port when the valve element is in the first valve position, and is in fluid communication with the return pressure inlet port when the valve element is in the second valve position.

10. The valve of claim 9, wherein the valve element has an internal channel formed therein that provides continuous fluid communication between the supply pressure inlet port and the second control chamber.

11. A two-position, two-stage servo valve, comprising:
a control pressure chamber including a supply pressure port, a return pressure port, and a control pressure port;
a control element at least partially disposed within the control pressure chamber and movable between (i) a first control position, in which the control chamber is in fluid communication with the supply pressure port and is fluidly isolated from the return pressure port, and (ii) a second control position, in which the control chamber is in fluid communication with the return pressure port and is fluidly isolated from the supply pressure port;
a valve body including a supply pressure inlet port, a return pressure outlet port, a first control pressure inlet/outlet port, a second control pressure inlet/outlet port, and an inner surface that defines a valve element chamber, the supply pressure inlet port in continuous fluid communication with the supply pressure port, the return pressure outlet port in continuous fluid communication with the return pressure port, the valve element chamber including a first control chamber, a second control chamber, and a third control chamber, the first control chamber larger than the second control chamber and in continuous fluid communication with the control pressure port, the second control chamber in continuous fluid communication with the supply pressure inlet port, the third control chamber located between the first control chamber and the second control chamber; and
a valve element disposed within the valve element chamber and including a first end, a second end, and an intermediate face, the first end larger than the second end and disposed within the first control chamber, the second end disposed within the second control chamber, the intermediate face located between the first end and the second end and disposed within the third control chamber, the valve element responsive to fluid pressure changes in the first control chamber to move between a first valve position and a second valve position, wherein:
the first end of the valve element has a first area, the second end of the valve element has a second area, and the intermediate face has an annular area, and
the first area is larger than a sum of the second area and the annular area.

12. The valve of claim 11, wherein:
when the control element is in the first control position, the supply pressure port is in fluid communication with the control pressure port and the return pressure port is fluidly isolated from the control pressure port, and
when the control element is in the second position, the return pressure port is in fluid communication with the control pressure port and the supply pressure port is fluidly isolated from the control pressure port.

13. The valve of claim 11, wherein:
when the valve element is in the first valve position, the first control pressure inlet/outlet port is in fluid communication with the return pressure outlet port, and the second control pressure inlet/outlet port is in fluid communication with the supply pressure outlet port, and
when the valve element is in the second valve position, the first control pressure inlet/outlet port is in fluid communication with the supply pressure inlet port, and the second control pressure inlet/outlet port is in fluid communication with the return pressure outlet port.

14. The valve of claim 11, wherein:
the supply pressure port is continuously in fluid communication with the second control chamber.

15. The valve of claim 11, wherein the valve element includes an internal channel formed therein that provides continuous fluid communication between the supply pressure inlet port and the second control chamber.

* * * * *